US008788501B2

(12) United States Patent
Li et al.

(10) Patent No.: US 8,788,501 B2
(45) Date of Patent: Jul. 22, 2014

(54) PARALLELIZATION OF LARGE SCALE DATA CLUSTERING ANALYTICS

(75) Inventors: Wen-Syan Li, Fremont, CA (US); Gufei Sun, Shanghai (CN)

(73) Assignee: SAP AG, Walldorf (DE)

( * ) Notice: Subject to any disclaimer, the term of this patent is extended or adjusted under 35 U.S.C. 154(b) by 218 days.

(21) Appl. No.: 13/205,460

(22) Filed: Aug. 8, 2011

(65) Prior Publication Data

US 2013/0006988 A1 Jan. 3, 2013

(51) Int. Cl.
*G06F 17/30* (2006.01)
(52) U.S. Cl.
USPC .......................................................... 707/737
(58) Field of Classification Search
CPC ................................................. G06F 17/30598
USPC .......................................................... 707/737
See application file for complete search history.

(56) References Cited

U.S. PATENT DOCUMENTS

| 6,269,376 | B1 | 7/2001 | Dhillon et al. | |
|---|---|---|---|---|
| 6,466,946 | B1 | 10/2002 | Mishra et al. | |
| 8,180,774 | B2 * | 5/2012 | Hendrickson et al. | 707/737 |
| 2003/0018637 | A1 | 1/2003 | Zhang et al. | |
| 2010/0106724 | A1 * | 4/2010 | Anderson | 707/737 |

OTHER PUBLICATIONS

Kittisak et al. "A lightweight method to K-means clustering", International Journal of mathematics and computers in simulation, issue 4, vol. 4, 2010.*
Extended EP Search Report for EP Application No. 12004776.6, mailed Sep. 19, 2012, 6 pages.
Burkardt, John, "K-Means Clustering", Virginia Tech, Advanced Research Computing, Interdisciplinary Center for Applied Mathematics, Sep. 21, 2009, 39 pages.
Glowacka, Dorota, et al., "K-means algorithm Gl07/M012", University College London, Department of Computer Science, Oct. 19, 2010, 6 pages.
Kozma, Laszlo, "k Nearest Neighbors algorithm (kNN)", Helsinki University of Technology, T-61.6020 Special Course in Computer and Information Science, Feb. 20, 2008, 33 pages.
Song, Yang, et al., "IKNN: Informative K-Nearest Neighbor Pattern Classification", PKDD 2007, Proceedings of the 11th European conference on Principles and Practice of Knowledge Discovery in Databases, Sep. 2007, pp. 248-264.

* cited by examiner

*Primary Examiner* — Cindy Nguyen
(74) *Attorney, Agent, or Firm* — Brake Hughes Bellermann LLP

(57) ABSTRACT

A cluster selector may determine a plurality of sample clusters, and may reproduce the plurality of sample clusters at each of a plurality of processing cores. A sample divider may divide a plurality of samples stored in a database with associated attributes into a number of sample subsets corresponding to a number of the plurality of processing cores, and may associate each of the number of sample subsets with a corresponding one of the plurality of processing cores. A joint operator may perform a comparison of each sample of each sample subset at each corresponding core of the plurality of processing cores with respect to each of the plurality of sample clusters reproduced at the corresponding processing core, based on associated attributes thereof.

17 Claims, 5 Drawing Sheets

PARALLELIZATION OF LARGE SCALE DATA CLUSTERING ANALYTICS

CROSS-REFERENCE TO RELATED APPLICATION

This application claims priority under 35 U.S.C. §119 to Chinese Patent Application 201110183886.4, filed Jun. 30, 2011, titled "PARALLELIZATION OF LARGE SCALE DATA CLUSTERING ANALYTICS," which is incorporated herein by reference in its entirety.

TECHNICAL FIELD

This description relates to parallel processing.

BACKGROUND

Parallel processing generally refers to the concept of dividing one or more computational tasks into two or more subtasks, each of which may be executed on, or using, a separate processor. In other words, each of two or more processors may be configured to execute one or more subtasks of a larger computational task. Through the use of such parallel processing techniques, the original computational task may be, in many cases, completed in a faster and more efficient manner than would be possible using just one of the processors.

In practice, however, a number of obstacles may exist which may make it difficult or impossible to perform parallel processing of a given computational task, particularly for certain types or classes of computational tasks. For example, there is typically at least a minimal amount of computational overhead associated with parallel processing. For example, for a given computational task that is to be executed in parallel, it may be necessary to copy some or all of the data related to the computational tasks to each of the processors to be used. More generally, it may be appreciated that non-trivial processing resources may initially be required to split or divide the original computational tasks for parallel processing of subtasks thereof using two or more processors. Further, a delay or difficulty at any one of the processors executing in parallel may result in a delay of the computation of the task as a whole. Moreover, as the subtasks are completed at the two or more processors, computational resources may be required to join the results of the parallel processing performed at each of the two or more processors, so as to obtain a unified computational result for the computational task as a whole. Thus, as a result of such computational overhead which may be associated with the division, processing, and unification of processing subtasks during parallel processing thereof, it may be impractical to utilize parallel processing techniques in many circumstances.

For example, certain types of computational tasks may require a comparison or other consideration of each element of a relatively very large dataset with each element of a relatively smaller dataset. For example, in a specific example for the sake of illustration, it may occur that a dataset including 3 million records, each having 300 attributes, may be required to be compared with each of 100 records of a second dataset (such as when, for example, it is desired to group each of the 3 million records into one of 100 clusters which is deemed to be most similar). Consequently, such a calculation would require 3 million by 300 by 100 individual calculations. Moreover, it would not be feasible to divide the datasets for processing using separate processors, because the nature of the calculation is to compare all the records and attributes of the first, larger dataset with each and every element of the second, smaller dataset. Consequently, it may be impractical or impossible to obtain appreciable benefits from the use of parallel processing techniques in the context of these and other types of computations.

SUMMARY

According to one general aspect, a computer system may include instructions recorded on a computer-readable medium. The system may include a cluster selector configured to determine a plurality of sample clusters, and to reproduce the plurality of sample clusters at each of a plurality of processing cores. The system may include an attribute divider configured to divide a plurality of samples stored in a database with associated attributes into a number of sample subsets corresponding to a number of the plurality of processing cores, and further configured to associate each of the number of sample subsets with a corresponding one of the plurality of processing cores. The system may include a joint operator configured to perform a comparison of each sample of each sample subset at each corresponding core of the plurality of processing cores with respect to each of the plurality of sample clusters reproduced at the corresponding processing core, based on associated attributes thereof.

Implementations may include one or more of the following features. For example, the cluster selector may be configured to receive a number of the plurality of sample clusters from a user by way of a graphical user interface (GUI). The system may include a merger configured to merge comparison results of the comparisons performed at each of the plurality of processing cores, to thereby populate the sample clusters with the plurality of samples. The number of sample subsets may be equal to the number of the plurality of processing cores, and each sample subset may include an equal number of samples. The system may include an attribute divider configured to divide attributes associated with each sample into attribute subsets for parallel processing thereof during the performing of the comparison.

The comparison may include a similarity comparison performed at each of the plurality of processing cores between each sample of each sample subset and a center of each cluster. The center of each cluster may be determined using an average attribute value of the samples included in each cluster. The joint operator may be configured to reassign samples from a first cluster to a second cluster, based on the comparison. A merger may be configured to merge comparison results of the comparison and may be configured to update a value of each center of each cluster, as needed, using the merged comparison results. The merger may be configured to determine a stability of the samples within each cluster, based on a number of the reassigned samples.

According to another general aspect, a computer-implemented method may include determining a plurality of samples stored in a database with associated attributes, determining a plurality of sample clusters, and reproducing the plurality of sample clusters at each of a plurality of processing cores. The method may include dividing the plurality of samples into a number of sample subsets corresponding to a number of the plurality of processing cores, associating each of the number of sample subsets with a corresponding one of the plurality of processing cores, and performing a comparison of each sample of each sample subset at each corresponding core of the plurality of processing cores with respect to each of the plurality of sample clusters reproduced at the corresponding processing core, based on associated attributes thereof.

Implementations may include one or more of the following features. For example, comparison results of the comparisons performed at each of the plurality of processing cores may be merged, to thereby populate the sample clusters with the plurality of samples.

Further, performing the comparison may include dividing attributes associated with each sample into attribute subsets for parallel processing thereof during the performing of the comparison. Performing the comparison also may include performing a similarity comparison at each of the plurality of processing cores between each sample of each sample subset and a center of each cluster.

According to another general aspect, a computer program product may be tangibly embodied on a computer-readable medium and may include instructions that, when executed, are configured to determine a plurality of samples stored in a database with associated attributes, determine a plurality of sample clusters, and reproduce the plurality of sample clusters at each of a plurality of processing cores. The instructions, when executed, may be further configured to divide the plurality of samples into a number of sample subsets corresponding to a number of the plurality of processing cores, associate each of the number of sample subsets with a corresponding one of the plurality of processing cores, and perform a comparison of each sample of each sample subset at each corresponding core of the plurality of processing cores with respect to each of the plurality of sample clusters reproduced at the corresponding processing core, based on associated attributes thereof.

Implementations may include one or more of the following features. For example, the instructions, when executed, may be configured to merge comparison results of the comparisons performed at each of the plurality of processing cores, to thereby populate the sample clusters with the plurality of samples.

The instructions, when executed, may be configured to divide attributes associated with each sample into attribute subsets for parallel processing thereof during the performing of the comparison. The comparison may include a similarity comparison performed at each of the plurality of processing cores between each sample of each sample subset and a center of each cluster.

The instructions, when executed, may be configured to reassign samples from a first cluster to a second cluster, based on the comparison. The instructions, when executed, may be configured to determine a stability of the samples within each cluster, based on a number of the reassigned samples.

The details of one or more implementations are set forth in the accompanying drawings and the description below. Other features will be apparent from the description and drawings, and from the claims.

DETAILED DESCRIPTION

Figure 1:
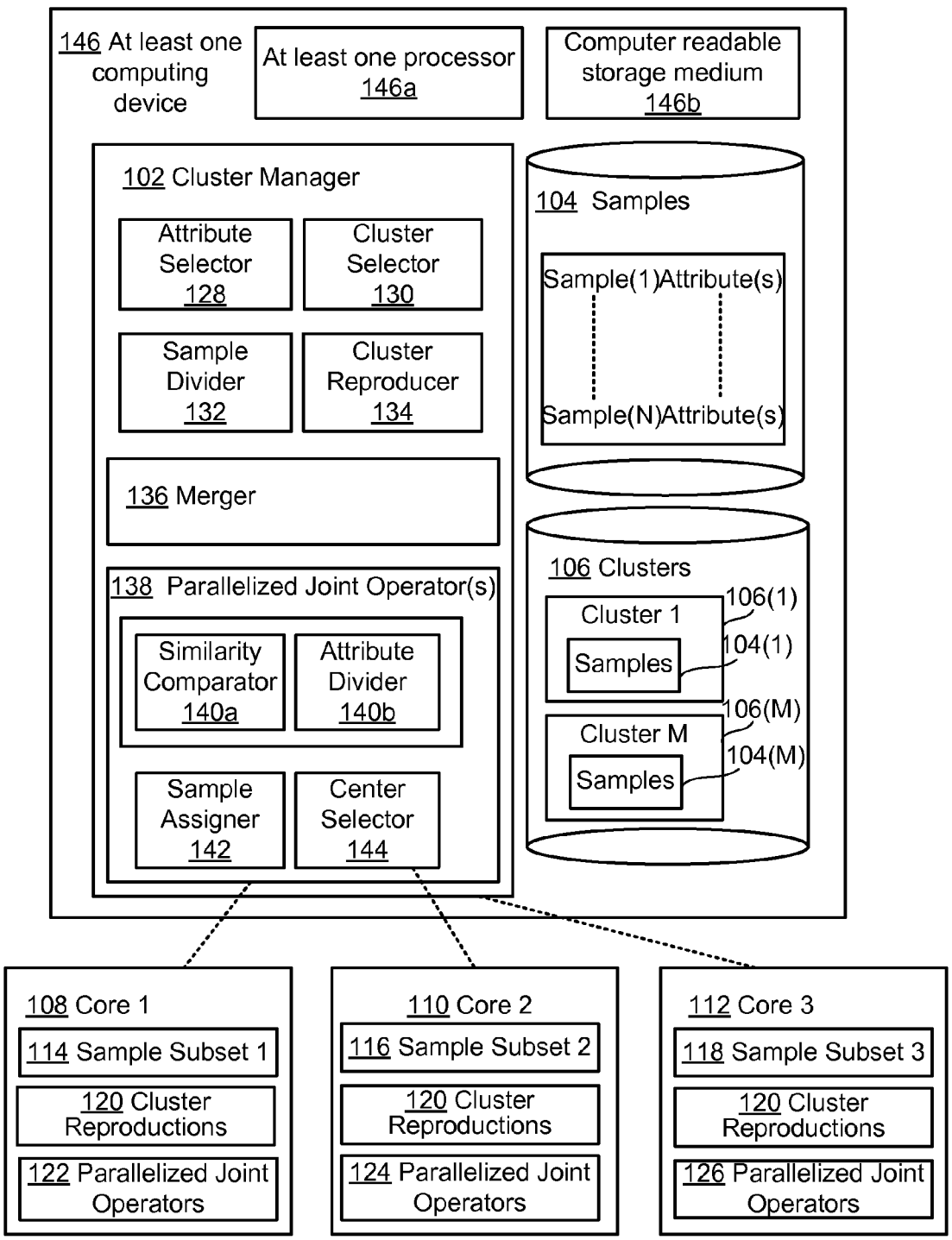
FIG. 1 is a block diagram of a system for performing parallel processing for large scale data clustering analytics.

FIG. 1 is a block diagram of a system 100 for performing parallel processing of large datasets during cluster analytics. In the example of FIG. 1, as shown, a cluster manager 102 may be configured to separate a plurality of samples 104 within a relatively large dataset to define a plurality of clusters 106, and to populate each of the clusters 106 with appropriate ones of the samples 104. Moreover, as described herein, the cluster manager 102 may be configured to generate and populate the clusters 106 with appropriate ones of the samples 104 in a manner which utilizes parallel processing techniques designed to leverage an availability of a plurality of processing cores, represented in the example of FIG. 1 by cores 108, 110, and 112. In this way, the clusters 106 may be formed in a highly configurable and efficient manner, and, through the use of the parallel processing techniques described herein, may be provided considerably more quickly than would be possible using a single one of the cores 108, 110, 112.

As just referenced, and as described in detail herein, the cluster manager 102 may be configured to enable a user of the system 100 to select or otherwise define the samples 104 for subsequent clustering thereof. For example, the user may select the samples 104 from among a plurality of possible sample databases, and/or may select the samples 104 as including a subset of data from within a larger database. In many of the examples that follow, the samples 104 are described as including data records representing a plurality of customers of a business, where each such customer may be described with respect to a plurality of predefined attributes. For example, a business may maintain a record of all past, present, and potential customers, and may store the identities of such customers in an appropriate setting (e.g., within a customer relationship management (CRM) system), along with a plurality of related customer attributes, such as, e.g., residence/address, yearly income, purchase history, occupation, or many other potential customer attributes which may be well known to be correlated with an ability of the business to maintain high levels of profitability and customer satisfaction.

Of course, such example description of the samples 104 and related attributes should be understood to be non-limiting in scope, and, in particular, it may be appreciated that, in other example implementations, the samples 104 may represent many other types of data and associated attributes. For example, the samples 104 may relate to goods or services which have been, or may be, sold by a business (e.g., such as may be found within an inventory management system). In other examples, the samples 104 may relate to resources of a business (e.g., resources related to facilities and/or information technology assets). More generally, the samples 104 may thus be understood to represent virtually any aspect of a business which may utilize, or be associated with, large datasets which include a plurality of records and associated attributes. Even more generally, it may be appreciated that such datasets may exist (and therefore may benefit from the techniques described herein) in a variety of non-business settings, such as, e.g., settings including schools, government, military, charitable, or various other context(s).

In all such settings, it may be desirable to group individual ones of the samples 104 into the plurality of clusters 106. For example, in the context of customer relationship management, the samples 104 may include a plurality of customer data records and associated attributes, as referenced above. Consequently, it may be desirable for a user of the system 100 to group the samples 104 into corresponding ones of the clusters 106, where the clusters 106 may be defined with respect to some aspect of customer relationship management that may be of interest to the user.

For example, in a specific scenario, the user may wish to define the clusters 106 as including customers who have relative levels of likelihood of making large purchases in the near future. For example, certain criteria may be associated with defining and rating such a likelihood. For example, customers sharing such characteristics as high annual incomes, recent large purchases, and other attribute-based factors which are thought to be correlated with the likelihood of future purchases may be grouped within a first cluster 106 (1), which would thus include a subset of samples illustrated as samples 104 (1). Meanwhile, conversely, customers with very different attribute values (e.g., low annual income, no history of recent purchases, and other attribute-based factors which are thought to be correlated with a low likelihood of upcoming future purchases) may be clustered within a separate cluster, illustrated in the example of FIG. 1 as cluster M 106 (M), which thus includes a subset of examples 104 illustrated as samples 104 (M).

Of course, although the simplified example of FIG. 1 only explicitly illustrates two clusters, it may be appreciated that a desired number of clusters may be formed. For example, in the illustrative example just provided, a total number of M clusters may be formed, where the clusters are defined along a scale or spectrum of predicted likelihood of future purchases by customers included therein. Of course, many other types of clusters may be formed using the system 100 of FIG. 1, and need not be formed according to the type of linear distribution just referenced.

More generally, it may be appreciated that various concepts related to the definition and formation of the clusters 106 are, by themselves, well known in the art, and are therefore not described herein in further detail, except as may be necessary or helpful in understanding operations of the system 100 of FIG. 1. Rather, further description of the system 100 of FIG. 1 is generally provided herein with respect to the specific example techniques implemented in the system 100 for the purpose of parallelizing computational processes that are associated with forming, defining, populating, and otherwise managing the clusters 106 with respect to the samples 104, and, more specifically, to various features and functions of the cluster manager 102 in performing such management of the clusters 106 in a manner which fully utilizes various parallel processing techniques with respect to the use of the available cores 108, 110, 112.

In this regard, it may be appreciated that the cores 108, 110, 112 are intended to represent virtually any known or future parallel processing platform or context. For example, each of the cores 108, 110, 112 may represent an individual server or other computing device which includes one or more processors. In additional or alternative implementations, each of the cores 108, 110, 112 may be included within a single server or other computing device. Thus, each of the cores 108, 110, 112 may be understood to represent, or include, any multi-computing platform in which a plurality of processors, central processing units (CPUs), or other processing resources are available, including network/device clusters. For example, parallel processing may utilize existing SMP/CMP (Symmetrical Multi-Processing/Chip-level Multi-Processing) servers. Thus, in the present description, it should be appreciated that the term core represents a unit(s) of processing power within any such environment in which multiple processing options are available.

Thus, it may be appreciated that the system 100 may be configured to operate in the context of, and to take full advantage of the features and functionalities of, any of the various parallel processing platforms just referenced, and/or other parallel processing platforms not specifically referenced, or combinations thereof. Consequently, as referenced above, the cluster manager 102 may be configured to enable parallelization of joint operations over a relatively large number of samples (and their respective attributes) into a relatively smaller number of clusters 106, using a plurality of processing cores, represented in the example of FIG. 1 by cores 108, 110, 112.

More particularly, as shown, the samples 104 may be divided into a plurality of sample subsets 114, 116, 118. As shown, each of the sample subsets 114, 116, 118 may be distributed to a respective one of the cores 108, 110, 112. The example of FIG. 1 illustrates three sample subsets 114, 116, 118 corresponding to the three available cores 108, 110, 112. Of course, more generally, the samples 104 may be divided into any appropriate or desired number of subsets, e.g., corresponding in number to a number of available cores. In the example implementations described herein, the samples 104 may be divided into sample subsets, such that each sample contains an approximate equal number of the samples 104. However, in other example implementations, it may occur that the sample subsets are of different sizes. For example, a sample subset assigned to a relatively high speed processing core may be provided with a larger number of samples than a sample subset associated with, or assigned to, a relatively lower speed processing core.

As opposed to the division of the samples 104 into the various sample subsets 114, 116, 118, the clusters 106 may be reproduced in their entirety for processing by each of the available cores 108, 110, 112. Specifically, as shown, the clusters 106 may be reproduced in their entirety as cluster reproductions 120 at each of the available cores 108, 110, 112. Consequently, as described in more detailed examples provided below, parallelized joint operators 122, 124, 126 at (or in association with) the respective cores 108, 110, 112 may be executed with respect to corresponding sample subsets 114, 116, 118 and in conjunction with the cluster reproductions 120. Specifically, for example, all of the examples in the example subsets 114 may be individually compared with, or otherwise considered relative to, all of the cluster reproductions 120, using the parallelized joint operators 122. Similarly, all of the samples in the sample subset 116 may individually be compared against all of the cluster reproductions 120, using the parallelized joint operators 124. Similarly, similar comments apply with respect to the sample subset 118 relative to the cluster reproductions 120, and with respect to the parallelized joint operators 126.

In this way, it may be observed that, in the aggregate, all of the samples 104 may individually be compared against each of the clusters 106, in a manner which utilizes a high degree of very efficient parallelization. As a result, an operator or other user of the system 100 may quickly obtain desired results. For example, as in the more detailed examples provided below, the operator of the system 100 may then be able to quickly define and form the clusters 106 in a desired fashion, so as to thereby utilize the clusters 106 thereafter in an otherwise conventional manner.

In the specific example of FIG. 1, the cluster manager 102 is illustrated as including an attribute selector 128. As referenced above, the samples 104 may each be associated with one or more attributes which are defined with respect to, or otherwise related to, the samples in question. As is well known, and as described in detail herein, the number and type of such attributes, and possible values or ranges of values thereof, may vary widely depending on a context of use of the system 100. In a given implementation of the system 100, it may occur that only a subset or a portion of the available attributes may be desired to be used in corresponding calculations. Additionally, or alternatively, it may occur that certain attributes should be weighted or otherwise considered differently (e.g., as being more or less important) then other available attributes. Consequently, the attribute selector 128 may be configured to enable a user of the system 100 to select and/or characterize available sample attributes in a desired manner. For example, although not specifically illustrated in the example of FIG. 1, an appropriate graphical user interface may be provided to the user of the system 100, where, as would be appreciated, a form and format of such a graphical user interface would depend on a particular context of use of the system 100.

A cluster selector 130 may be configured to enable the user of the system 100 to define or otherwise characterize a desired nature of the clusters 106. For example, depending on, e.g., relevant clustering algorithms being used or other factors, the cluster selector 130 may enable the user of the system 100 to define a number of the clusters 106 to be calculated. Additionally, or alternatively, the cluster selector 130 may enable the user of the system 100 to further characterize the clusters 106. For example, the user may define a maximum size of the clusters 106, or a relative size of the clusters 106 to one another, or any other feature or characteristic of the clusters 106. As with the attribute selector 128, an appropriate graphical user interface may be provided by the cluster selector 130 for use by the user of the system 100 in performing the just-referenced parameterization of the clusters 106.

For example, as shown in FIG. 1, the clusters 106 may include M clusters, illustrated in FIG. 1 as a first cluster 106 (1) and an M cluster 106 (M). In the example, then, the cluster selector 130 may be considered to enable the user of the system 100 to define the parameter M, so that, as described, all M clusters may be copied as cluster reproductions 120 at the available cores 108, 110, 112.

A sample divider 132 may be configured to execute the division of the samples 104 into the sample subsets 114, 116, 118. As referenced above, the sample divider 132 may execute by dividing the samples 104 into a number of sample subsets which is equivalent to any number of available cores, where each of the sample subsets may be approximately equal in size to one another. As referenced above, however, the sample divider 132 also may be associated with a graphical user interface or other input techniques which may enable the user of the system 100 to configure the sample subset in a more customized manner. For example, the sample subsets 114, 116, 118 may be different in size. In other examples, the sample subsets may be defined and divided based on specified parameter attributes thereof, rather than by a simple partitioning of the samples 104.

A cluster reproducer 134 may be configured to reproduce the clusters 106 as cluster reproductions 120 at each of the cores 108, 110, 112. Relevant reproduction techniques, by themselves, are well known and therefore are not described here in further detail.

A merger 136 may be configured to join, synchronize, aggregate, or otherwise merge processing results from the cores 108, 110, 112. For example, the merger 136 may be configured to merge intermediate processing results as part of a larger set of operations of the cluster manager 102, as well as to merge final result sets. Such merge operations in the context of parallel processing, by themselves, are well known, and may include, for example, populating a common database or other memory with results from each relevant processing core, and/or performing associated processing thereof (in particular, performing processing of the data which may only be performed at a central processor, examples of which are known and/or provided in detail below).

For example, in the example of FIG. 1, parallelized joint operators 138 may be configured to perform the types of operations referenced above with respect to the operators 122, 124, 126. Generally speaking, for example, as referenced, such joint operations may include individual comparison of the samples 104 (or subsets thereof) with each of the clusters 106. The examples below discuss similarity comparisons and related processing as one example of such joint operations. However, it will be appreciated that other types of joint operations and related processing may be performed by the cluster manager 102, as well.

Nonetheless, in the specific example of FIG. 1, for the sake of illustration, the parallelized joint operators 138 may include a comparator 140. The comparator 140 may be configured, for example, for comparison of the samples 104 (or subsets thereof) individually with each of the clusters 106.

Based on results of such comparisons, a sample assigner or sample re-assigner 142 may be configured to associate each of the samples with a given one of the clusters 106. Subsequently, a center selector 144 may be configured to analyze the thus-formed clusters and included samples, to thereby determine a new or updated center or other metric associated with each cluster. Subsequently, the comparator 140 may continue in an iterative fashion by repeating the comparisons of the individual samples with each of the newly-defined clusters, so that the sample re-assigner 142 may accordingly reassign the samples, as needed, with respect to the current cluster definitions. This iterative process may continue until, e.g., the clusters reach a defined level of stability (e.g., defined with respect to a maximum number or percentage of sample reassignments between and among newly-formed clusters in a given iteration or set of iterations of the parallelized joint operators 138, and/or based on a predefined number of such iterations reaching a threshold).

As referenced above, in specific example implementations of the system 100 of FIG. 1, the comparator 140 may execute the referenced comparisons using a similarity comparator 140a which is configured to compare a level of similarity of each individual sample (e.g., of a sample subset) with each of the clusters 106. By themselves, such similarity measurements are well known and would be apparent to one of skill in the art, and are therefore not described in detail, except as may be necessary or helpful in understanding operations of the system 100 of FIG. 1.

Generally speaking, however, it may be appreciated that such similarity measurements may be executed with respect to the various attributes (or subsets thereof) of the samples 104. For example, as referenced above, the attribute selector 128 may be configured to enable the user of the system 100 to define attributes (and/or characteristics or values thereof) of the samples 104, so that the similarity comparator 140A may thus be configured to perform similarity measurements between each individual sample and each of the clusters 106, based on the defined attributes (or characteristics or values thereof).

In many cases, as described in detail below, (e.g., with respect to FIG. 2), it may occur that each of the samples 104 is associated with a relatively large number of attributes which are defined or designated for use in similarity comparisons with each of the clusters 106. Consequently, it may be desirable to utilize parallel processing within the context of the larger parallel processing of the samples themselves relative to the clusters 106, but with respect to the attributes in question. In other words, for example, an attribute divider 140b may be configured to divide or otherwise partition or designate the selected attributes, in much the same way that the sample divider 132 may be configured to divide the samples 104 into the sample subsets 114, 116, 118. Consequently, it may be appreciated that similarity comparisons of the similarity comparator 140a may be accelerated through the use of parallel processing of subsets of the attributes of the samples which have been designated for use in the similarity comparisons. As just referenced, example techniques for the use of such parallel processing of the sample attributes in the context of similarity comparisons between the individual samples and the clusters 106 is provided below, e.g., with respect to FIG. 2.

In the example of FIG. 1, the cluster manager 102, the samples 104, and the clusters 106 are illustrated as being implemented through the use of at least one computing device 146, which may include or incorporate at least one processor 146a, as well as a computer readable storage medium 146b. In this context, it may generally be appreciated that FIG. 1 illustrates that the features and functions of the system 100 may be recognized through the use of instructions or other code stored using the computer readable storage medium 146b, and executed by the at least one processor 146a.

Specifically, for example, FIG. 1 illustrates a single computing device 146; however, it may be appreciated that the at least one computing device 146 may represent a plurality of computing devices, each of which may utilize two or more processors, perhaps executing in parallel as described herein. For example, the at least one processor 146b may be represented by one or more of the cores 108, 110, 112 in some example implementations, while in another example implementations, the at least one computing device 146 may represent a central computer which is in communication with servers or other computers which house the cores 108, 110, 112.

Consequently, although the cluster manager 102 and components thereof are illustrated as being included, or executed in conjunction with, the at least one computing device 146, it may be appreciated that some or all of the cluster manager 102 may be executed using multiple different computing devices, e.g., one or more of the cores 108, 110, 112. That is, for example, in some implementations, portions of the cluster manager 102 may be executed on a first computing device and associated processor, while other portions of the cluster manager 102 may be executed using one or more separate computing devices/processors.

For example, the computing device 146 may represent a central computing device which is accessed by the user of the system 100 and which executes components of the cluster manager 102, such as, e.g., the attribute selector 128, the cluster selector 110, the sample divider 132, the cluster reproducer 134, and the merger 136. Meanwhile, as referenced above and as may be appreciated from the illustration of FIG. 1, the parallelized joint operators 138 may be instantiated and/or otherwise executed as the parallelized joint operators 122, 124, 126 at each of the respective cores 108, 110, 112. In still other embodiments, it may be appreciated that the at least one computing device 146 may represent one of the cores at which the parallel processing described herein is executed.

Such variations on the architecture or other structure of the system 100 would be apparent to one of skill in the art, and are therefore not described here in more detail. Moreover, many other variations are possible and would be apparent. For example, any single component of the cluster generator 102 may be executed using two or more components, perhaps executing on different computing devices in communication with one another over a network. Conversely, two or more of the components of the cluster manager 102 may be executed using a single component. Many other implementations are described herein by way of example, or would be apparent as well.

Figure 2:
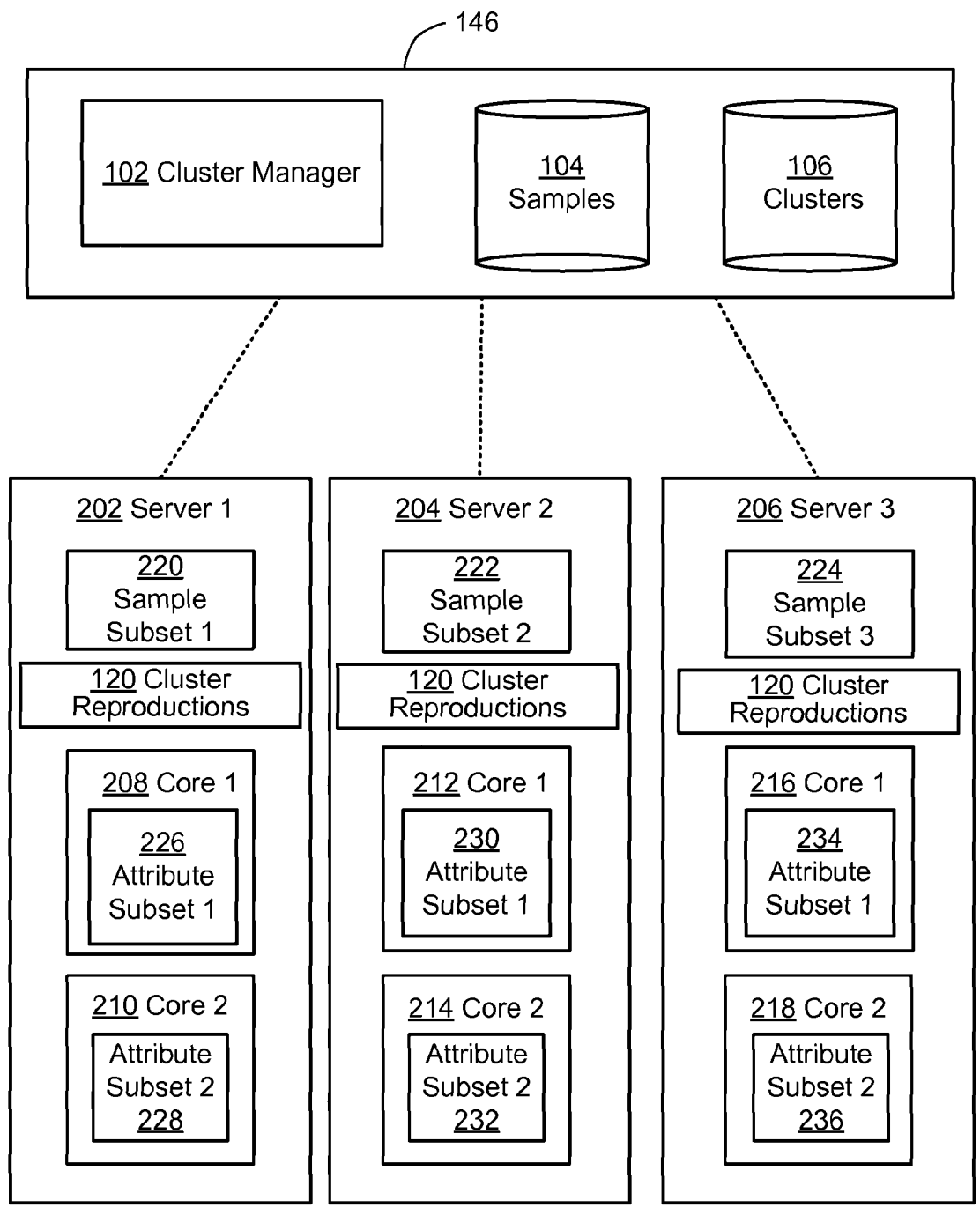
FIG. 2 is a block diagram illustrating a more detailed example of operations of the system of FIG. 1.

FIG. 2 is a block diagram of a more detailed implementation of the system 100 of FIG. 1. Specifically, as referenced above (e.g., with respect to the attribute divider 140b), FIG. 2 illustrates an example implementation in which the cluster generator 102 supplements parallel processing of subsets of the samples 104 with additional parallel processing of subsets of the attributes of the sample subsets.

Specifically, in the example of FIG. 1, the cores 108, 110, 112 are illustrated and described generically as representing virtually any type, quantity, or combination of a plurality of cores which may be configured to process in parallel with one another. In the more specific example of FIG. 2, servers 202, 204, 206 are illustrated as each including at least two processing cores. In other words, as shown, the servers 202, 204, 206 represent multi-core servers. In this specific example illustrated, as shown, the server 202 includes cores 208, 210, while the server 204 includes cores 212, 214, and the server 206 includes cores 216, 218.

Thus, in operation, the cluster manager 102 may be configured to divide the samples 104 into sample subsets 220, 222, and 224, which may then be assigned respectively to servers 202, 204, 206, as shown. For example, the sample divider 132 may be configured to divide the samples 104 into the sample subsets 220, 222, 224, in the manner described above with respect to FIG. 1. In this regard, it may be appreciated that many of the features and functions of the cluster manager 102 described above with respect to FIG. 1 may be similarly executed in the context of FIG. 2. For example, the attribute selector 128 may receive selections of the various attributes associated with each of the samples 104 to be used in the cluster generation process, while the cluster selector 130 and the cluster reproducer 134 may be configured to perform their respective functions, as well (e.g., although not specifically illustrated in the example of FIG. 2, selecting a number and/or characteristic of the clusters 106, and copying all of the clusters 106 for association thereof with the servers 202, 204, 206). Similar comments apply to operations of the merger 136 and the parallelized joint operators 138 with respect to their use in performing corresponding functions in the context of FIG. 2. Consequently, it will be appreciated that such operations of the cluster manager 102, to the extent that they are similar with respect to the functions described with respect to FIG. 1, are not repeated here in detail.

With regard to the sample subset 220 (with the understanding that similar comments apply to the sample subset 222 and the sample subset 224), it may occur that each sample of the sample subset 220 is to be compared (e.g., is to have a level of similarity judged) relative to each and all of the clusters 106, as copied for association with, and used by, the server 202. In other words, as described herein in detail, a first sample of the sample subset 220 may be compared for similarity thereof with respect to each and all of the clusters 106. Subsequent, a second sample of the sample subset 220 may similarly be compared against each and all of the clusters 106, and so on until all samples of sample subset 220 have been thus compared. In the example implementation of FIG. 2, it is assumed that the samples 104 are each associated with a relatively large number of associated attributes, and that a relatively large number of such available attributes have been selected for use in the just-referenced similarity comparisons.

In the example of FIG. 2, then, such a relatively large pool of attributes may be divided into corresponding attribute subsets, e.g., the attribute subset 226 associated with the core 208 of the server 202, and the attribute subset 228 associated with the core 210 of the server 202. Specifically, for example, the attribute divider 140b may be configured to divide the set of attributes to be used into a desired number of subsets, e.g., a number corresponding to a number of available cores located at a corresponding multi-core server used to process corresponding samples associated with the attributes in question.

Subsequently, it may be appreciated that comparisons based on the associated attributes may proceed in parallel with one another, so that the overall similarity comparisons may be completed in a faster and more timely manner. Moreover, as referenced above, and as illustrated in the example of FIG. 2, similar comments apply to the servers 204, 206. In particular, as shown, the attributes associated with the sample subset 222 may be divided into attribute subsets 230 and 232, for parallel processing thereof using respective cores 212, 214 of the server 204. Similar comments apply to the attribute subsets 234, 236 associated respectively with the cores 216, 218 of the server 206.

Figure 3:
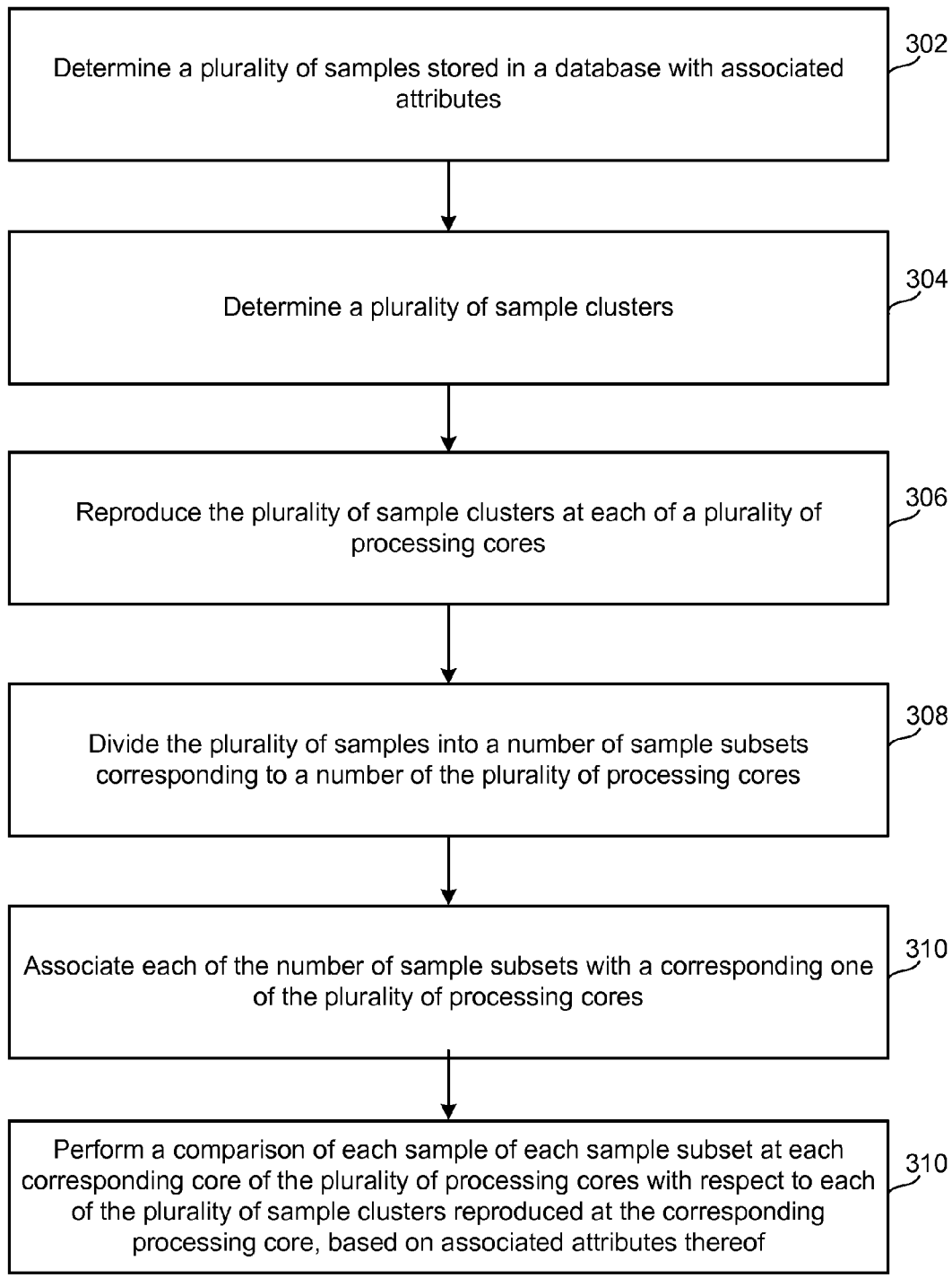
FIG. 3 is a flowchart illustrating example operations of the systems of FIGS. 1 and 2.

FIG. 3 is a flowchart 300 illustrating example operations of the systems 100, 200 of FIGS. 1 and 2. In the example of FIG. 3, operations 302-312 are illustrated as separate, sequential operations. However, it will be appreciated that, in other example implementations, two or more of the operations 302, 312 may be implemented in a partially or completely overlapping or parallel manner. Moreover, the operations 302-312 may be performed in a different order than that shown, including, e.g., in a nested, looped, or iterative fashion. Additionally, additional or alternative operations, not specifically illustrated in the example of FIG. 3, also may be included, and/or one or more operations, or portions thereof, may be omitted.

In the example of FIG. 3, a plurality of samples stored in a database with associated attributes may be determined (302). For example, the attribute selector 128 may be configured to receive a selection of specified attributes stored in association with the sample 104.

A plurality of sample clusters may be determined (304). For example, the cluster selector 110 may be configured to identify, characterize, parameterize, and/or otherwise identify or determine the clusters 106.

The plurality of sample clusters may be reproduced at each of a plurality of processing cores (306). For example, the cluster reproducer 134 may be configured to reproduce all of the clusters 106 defined or identified with respect to the relevant samples 104, at each of the cores 108, 110, 112 (or, in the example of FIG. 2, at each of the servers 202, 204, 206).

The plurality of samples may be divided into a number of sample subsets corresponding to a number of the plurality of processing cores (308). For example, the sample divider 132 may be configured to divide the samples 104 into the sample subsets, 114, 116, 118 (or, in the example of FIG. 2, into sample subsets 220, 222, 224).

Each of the number of sample subsets may be associated with a corresponding one of the plurality of processing cores (310). For example, the sample divider 132 may be configured to copy or otherwise provide sample subsets of the samples 104 (e.g., the sample subsets 114, 116, 118 of FIG. 1, or the sample subsets 220, 222, 224 of FIG. 2). For example, the sample divider 132 may be configured to copy each of the sample subsets to a memory associated with, e.g., readable by, a corresponding one of the plurality of processing cores (e.g., cores 108, 110, 112 of FIG. 1, or servers 202, 204, 206 of FIG. 2).

A comparison of each sample of each sample subset at each corresponding core of the plurality of processing cores may be performed with respect to each of the plurality of sample clusters reproduced at the corresponding processing core, based on associated attributes thereof (312). For example, the parallelized joint operator 138 (e.g., or instances 122, 124, 126 thereof) may be configured to perform such comparisons. For example, the parallelized joint operator 122 may be configured to compare each sample of the sample subset 114 with each of the reproduced clusters 120 associated with the core 108, based on the attributes of each sample of the sample subset 114. Similar comments, of course, apply with respect to the parallelized joint operators 124, 126 and the respective sample subsets 116, 118.

In specific examples described herein, the comparisons may include similarity comparisons between each of the subset samples and each of the plurality of clusters reproduced at each of the processing cores. For example, the attributes associated with a particular sample of a particular sample subset may be used to perform such a similarity comparison with each of the plurality of reproduced clusters, as described in detail herein. Specifically, for example, as described above with respect to FIG. 2, a relatively large number of such sample attributes to be used in such a similarity comparison may be further divided into sample attribute subsets, for subsequent use thereof in additional parallelized processing in the context of such similarity comparisons.

It may be appreciated that additional or alternative aspects of such parallel processing may be executed, as described above with respect to FIGS. 1 and 2, or as otherwise would be apparent. For example, at a completion of such parallel processing, or of intermediate steps thereof, appropriate merge operations may be conducted in order to combine or otherwise merge the results of the parallel processing (or of intermediate operations thereof). For example, the merger 136 may be configured to combine a parallel processing of attribute subsets 226, 228 associated with a given subset sample, so as to complete a similarity comparison of that subset sample with a given sample cluster. Similarly, the merger 136 may be configured to merge comparison results associated with each of the sample subsets 114, 116, 118 in the context of FIG. 1, or of comparison results of the sample subsets 220, 222, 224 in the context of FIG. 2.

Of course, further additional or alternative operations may be included, depending on a specific context of a given example implementation. A particular such example is provided below in the context of an execution of the k-means algorithm, with respect to FIGS. 4, 5A, and 5B.

Figure 4:
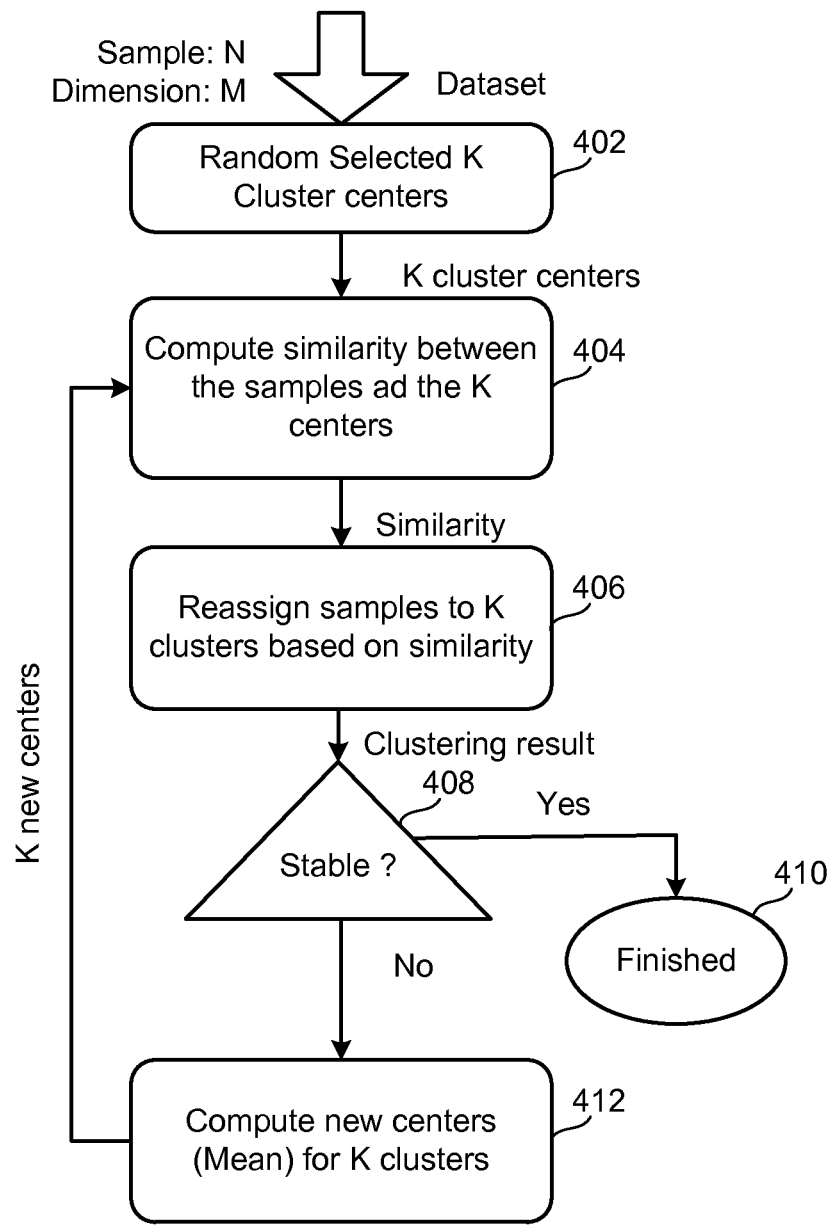
FIG. 4 is a flowchart illustrating a use of the systems and operations of FIGS. 1-3 in the context of the k-means clustering algorithm.
Figure 5A:
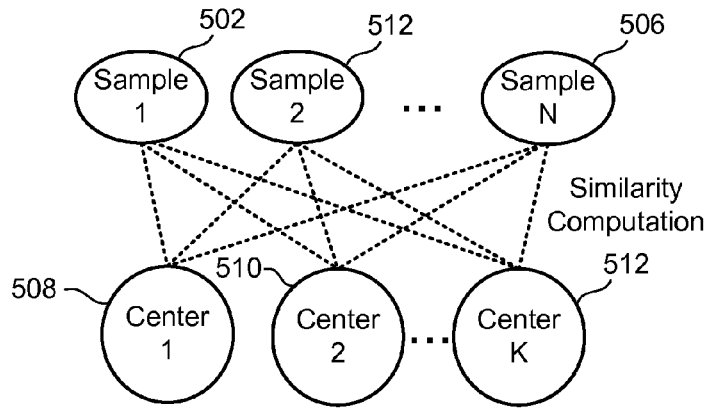
FIGS. 5A and 5B are block diagrams illustrating a computational nature of the processing techniques associated with FIGS. 1-4.
Figure 5B:
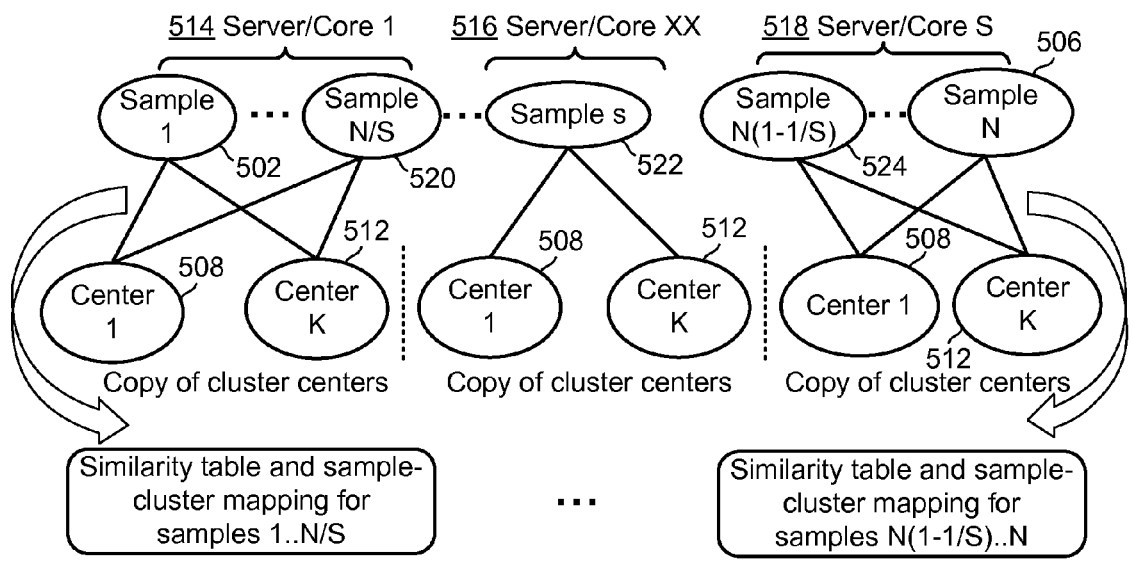

Specifically, FIGS. 4 and 5A, 5B provide an example of implementations of the systems and operations of FIGS. 1-3 in the context of implementing the k-means algorithm. As referenced above, and as is well known, the k-means algorithm is an analytical method which is designed to partition "N" samples (e.g., the samples 104) into "k" clusters (e.g., the clusters 106), such that each of the "N" samples belongs to the $k^{th}$ cluster with the nearest mean. As the k-means algorithm, by itself, is a well known algorithm with many known fields of implementation, neither the k-means algorithm itself nor examples of the many fields of implementation are provided here in detail, except as may be necessary or helpful in understanding the features and functions of the systems and operations described herein.

Nonetheless, for the sake of explanation and example, FIG. 4 illustrates operations 402-412 which encompass a complete execution of the k-means algorithm. In the context of FIGS. 4, and 5A, 5B, and as referenced above, a specific example or set of examples is referenced in which the "N" samples 104 may include a large number (e.g., 3 million) of customer profiles of customers of a utility company which provides energy and related services. In such examples, each of the customer profiles may have a defined number of attributes (e.g., 300 attributes). For example, as would be well known in such context, such attributes may include, e.g., household income or other financial characteristics associated with a corresponding customer profile, energy usage histories, residence characteristics (e.g., whether the associated customer lives in a house or an apartment), or any other characteristic or attribute which might be associated with a customer, and which might be relevant to the timely and profitable delivery of utilities thereto.

Further, as also referenced above, in the systems of FIGS. 1 and 2, and in the k-means algorithm in general, it may be possible for the user to select and otherwise characterize a number of the k clusters to be formed. For the sake of the provided examples, it is assumed that the example implementation of the k-means algorithm will cluster the 3 million customer profiles into 100 clusters, using the corresponding values for the 300 attributes associated with each of the 3 million customer profiles.

Thus, in the example of FIG. 4, operations may initially begin with a random selection of k cluster centers (402). That is, as just referenced, a user may desire a number k of clusters that is equal to, e.g., 100 clusters. In the context of the k-means algorithm described herein, each such cluster may be defined with respect to a center thereof, against which each of the "N" samples is compared for the degree of similarity thereto. That is, as is known in the k-means algorithm, and as described below, an ideal or desired final set of the k=100 clusters should be formed such that all of the N=3 million samples are assigned to a cluster having a center which is the most similar of all the centers to the sample in question.

Thus, in this context, and as is well known in the context of k-means algorithm implementations in general, the term center or cluster center should be understood to refer to a representative or defined attribute, or set or combination of attributes, which may be used to designate or characterize the clusters relative to one another. For example, in a simple example, one of the 300 attributes of the 3 million customer profiles may include a geographical location of the corresponding customer (e.g., using a zip code or a latitude/longitude representation of location). In such examples, it may occur that such location attributes are designated as the basis for definition of the 100 clusters, so that 100 of the 3 million geographical locations may be used to define the clusters (i.e., to define the cluster centers). In such examples, using the methods described below, each of the 3 million customers would be associated with a corresponding cluster and cluster center which has a closest geographical location of all the clusters to the particular customer in question. In this way, all of the 3 million customers may be assigned to corresponding, geographically-defined clusters.

Of course, in other, more detailed examples, the cluster centers may be defined with respect to sets or combinations of attributes. For example, it may be possible to normalize values of the attributes, e.g., by assigning an attribute value between 0 and 1 to each of the 300 attributes, so that each of the 3 million customers has their corresponding attribute value between 0 and 1 for each of the 3 million attributes. In such examples, it may be possible to select a desired set or combination of attributes, and to use the normalized values for the selected attributes to calculate a corresponding set of centers for the 100 clusters. Again, such techniques, by themselves, are well known and are therefore not described herein in further detail, except as may be necessary or helpful in understanding the examples of FIGS. 4 and 5A, 5B.

As referenced above, in the example of FIG. 4, the operation 402 thus represents an initial, best guess, or random selection of the selected k cluster centers, simply as a means of initiating iterations of the algorithm of FIG. 4. For example, in the simplified geographical-based clustering described above, operation 402 may include selecting 100 of the 3 million customers at random, and using the corresponding 100 geographical locations as the initial set of cluster centers. In other examples referenced above, the operation 402 may include selecting 100 customers at random, and then analyzing the relevant, associated normalized attribute values to calculate the corresponding 100 centers.

Once the initial set of cluster centers has been selected as just described, then similarity between each of the N=3 million samples and the k=100 cluster centers may be computed (404). For example, as should be apparent on the above descriptions of FIGS. 1-3, the computation of the operation 404 would generally require 3 million by 300 by 100 calculations (assuming that all of the 300 attributes are to be used). Nonetheless, using the features and functions described above with respect to FIGS. 1-3, such computations may be parallelized in a manner which facilitates fast and timely execution of such calculations.

Specifically, as described above with respect to FIG. 1, the N=3 million samples may be divided into a number S which equals a number of available servers or processing cores. Then, as described, all of the k=100 cluster centers may be reproduced for each of the S servers/cores. As may be observed, such reproduction may be practical and straightforward, assuming that the number k of desired cluster centers is small relative to the number N of samples to be grouped, so that the replication of the k cluster centers does not incur relatively significant overhead.

Although not discussed specifically with respect to FIG. 1, it may occur that the similarity measurements to be performed between each sample of each of the thus-divided sample subsets and each and all of the corresponding cluster centers may be conducted using a similarity table which characterizes the relevant attributes (or sets or combinations thereof) relative to each of the corresponding cluster centers, so that relative degrees of similarity there between may be determined. By themselves, such similarity tables, and uses thereof, are well known. However, in the examples of FIGS. 1-4, and as described in more detail below with respect to FIGS. 5A and 5B, such similarities may be similarly partitioned into a number s partitions or segments, and stored in association with the same server or processing core as their corresponding samples. In other words, as described herein, the N=3 million samples may divided into a number S=available servers/cores of sample subsets, and the corresponding similarity table may similarly be divided into a number S=available servers/cores of similarity table subsets.

Meanwhile, FIG. 5B conceptually illustrates a manner in which the resource-intensive joint operations of the operation 404 may be parallelized using the techniques described herein. As referenced above, the techniques described with respect to FIG. 5B may be implemented using, for example, either a cluster of multiple servers and/or using a single server which includes a plurality of cores. Therefore, in the provided examples, it may be appreciated that references to a server/core or to servers/cores should be understood to refer to either or both of these options for implementation. Specifically, as shown, a number S or C of available servers/cores is illustrated by servers 514, 516 . . . 518. As shown and described, the N=3 million samples may be divided into sample subsets corresponding to, and assigned to, each of the available servers/cores 514, 516 . . . 518. Specifically, as shown, samples (1~N/S) or (1~N/C) (illustrated as samples 502 . . . 520 in FIG. 5B) may be assigned to the first server/core 514. Similarly, a corresponding number of samples and a second sample subset (represented by sample 522 in FIG. 5B) would be assigned to the second server/core 516, and so on until the final server/core 518, which would receive the final sample subset, including the N(1−(1/S)) (or N(1−1/C)) sample 524 to the final sample 506. From the above, it may be appreciated that in the following, for the sake of simplicity and only as a matter of notation, the notation "S" is generally used by itself, but may nonetheless be understood to refer to either one of a plurality of servers or one of a plurality of cores executing on a single server Meanwhile, FIG. 5B conceptually illustrates a manner in which the resource-intensive joint operations of the operation 404 may be parallelized using the techniques described herein. As referenced above, the techniques described with respect to FIG. 5B may be implemented using, for example, either a cluster of multiple servers and/or using a single server which includes a plurality of cores. Therefore, in the provided examples, it may be appreciated that references to a server/core or to servers/cores should be understood to refer to either or both of these options for implementation. Specifically, as shown, a number S or C of available servers/cores is illustrated by servers 514, 516 . . . 518. As shown and described, the N=3 million samples may be divided into sample subsets corresponding to, and assigned to, each of the available servers/cores 514, 516 . . . 518. Specifically, as shown, samples (1~N/S) OR (1~N/C)(illustrated as samples 502 . . . 520 in FIG. 5B) may be assigned to the first server/core 514. Similarly, a corresponding number of samples and a second sample subset (represented by sample 522 in FIG. 5B) would be assigned to the second server/core 516, and so on until the final server/core 518, which would receive the final sample subset, including the N(1−(1/S)) (or N(1−1/C)) sample 524 to the final sample 506. From the above, it may be appreciated that in the following, for the sake of simplicity and only as a matter of notation, the notation "S" is generally used by itself, but may nonetheless be understood to refer to either one of a plurality of servers or one of a plurality of cores executing on a single server.

As illustrated in FIG. 5B, each of the servers/cores 514, 516 . . . 518 would also receive, or have assigned thereto, all of the k cluster centers 508 . . . 512. Further, as shown and as referenced above, any similarity table entries and/or sample-cluster mappings for samples of a given sample subset also may be copied to and/or stored at a corresponding one of the servers/cores 514, 516 . . . 518. For example, as shown, the server/core 514 which receives samples 502 . . . 520 would similarly receive corresponding similarity table entries and sample-cluster mappings for corresponding samples of the sample subset (i.e., the first to the N/S samples of the N samples). Meanwhile, and similarly, the server/core 518 would receive the similarity table entries and sample-cluster mappings for samples corresponding to the relevant sample subsets (i.e., the N(1−(1/S)) . . . N) samples). Although not specifically illustrated, it may be appreciated that similar associations or assignments of relevant similarity table entries and sample-cluster mappings may be performed for each of the sample subsets and associated servers/cores.

Thus, it may be appreciated that the otherwise-expensive operation 404 may be parallelized on the S servers/cores, and thereafter execute independently of one another. Specifically, similarity measurements and comparisons may be made between each sample of the relevant sample subset and each and all of the cluster centers. In this context, as described above, such similarity comparisons may include, or be based on, calculations associated with the M=300 attributes selected for defining similarity in the examples described herein.

For example, with respect to FIG. 5B, it may be appreciated that the sample 502 may be associated with corresponding values for the 300 attributes, and that the centers 508 . . . 512 may be similarly defined with respect to the 300 attributes. Thereafter, the first sample 502 may initially be compared to the first center 508 in order to determine a relative similarity thereto.

For example, such similarity may be computed using the known Euclidean distance illustrated in the example of Equation 1 below:

$$d = \sqrt{\sum_{1}^{M} (x_i - x'_i)^2}$$ Equation 1

For example, for the first sample 502 represented as "sample A," and for the first center 508, represented as "sample B," the Euclidean distance d of Equation 1 may be calculated according to equation two:

$$\text{Sample } A = [x_1, x_2, \ldots, x_M]$$
$$\text{Sample } B = [x'_1, x'_2, \ldots, x'_M]$$
$$d(A, B) = \sqrt{(x_1 - x'_1)^2 + (x_2 - x'_2)^2 + \ldots + (x_M - x'_M)^2}$$ Equation 2 where, as shown, the M attributes are illustrated for each of the samples A, B as $x_1 \ldots x_M$.

Thus, in such examples, this Euclidean distance may be computed as a similarity measurement for a relative similarity of the first sample 502 to each of the clusters 508 . . . 512, in turn, and thereafter for each remaining sample of the sample subset assigned to the first server/core 514, up to and including the last such sample of the relevant sample subset, i.e., the N/S sample 520. Similar comments would apply to calculations performed at the remaining servers/cores 516 . . . 518.

Further, as described above, e.g., with respect to the attribute divider 140b, it may be possible to further parallelize the just-referenced similarity calculations, in a manner analogous to the parallelization of similarity calculations for the N=3 million samples as a whole. Specifically, as referenced above, it may occur that the servers/cores 514, 516 . . . 518 may represent the multi-core servers 202, 204, 206 of FIG. 2. Then, the 300 attributes may be divided into corresponding attribute subsets, for parallelized processing thereof at a plurality of cores associated with each such multi-core server.

In a specific example, with reference to FIG. 2, it may occur that the sample subset 220 would include one million of the 3 million customer profiles, while the core 208 would be associated with the attribute subset 226 including 150 of the 300 attributes, while the second core 210 would include a remaining 150 attributes within the attribute subset 228. In this way, the similarity calculations of equations 1-2 may be further parallelized over the number of available attributes, so as to further facilitate fast and timely similarity calculations.

Once a similarity measure has been calculated between each sample of each sample subset and each and every cluster center, it becomes possible to reassign the samples within and among the k cluster centers, based on the similarity measures (406). For example, with respect to the first server/core 514 of FIG. 5B, as described above, similarity measures may be calculated between each of the samples 502 ... 520 and each and every one of the centers 508 ... 512.

Thus, for example, the first sample 502 will have a similarity measurement which is closest to one of the cluster centers 508 ... 512, and therefore will be assigned to that cluster center. Similar assignments may be made for remaining ones of the samples of the sample subset assigned to the server/core 514, up to and including the N/S sample 520, so that, at the conclusion of the operation 406, all of the samples 502 ... 520 have been assigned to one of the core centers 508 ... 512. Of course, similar comments apply to reassignment of samples of the sample subset at the server/core 516, into samples of the sample subset 524 ... 506 at the server/core 518. It may thus be explicitly observed that, in the examples of FIGS. 4 and 5B, all of the N=3 million samples have been compared to each and every of the k=100 cluster centers, in a manner which has been parallelized and thus computed in an efficient manner.

Subsequent to the operation 406, a stability determination may be made (408). For example, in a simple example, the stability of the populations of the k=100 cluster centers may be determined simply based on a number of iterations of the flowchart 400 of FIG. 4. That is, for example, a maximum number of iterations may be defined, after which stability is assumed. Additionally, or alternatively, stability may be judged based on other metrics. For example, stability may be determined as a measure of a number of samples which have been reassigned (e.g., changed between) one cluster and another cluster of the k=100 cluster centers during the operation 406. That is, as is known in conventional implementations of the k-means algorithm, once a minimal number of samples is reassigned between clusters during the operation 406 of an iteration of the flowchart 400, it may be assumed that further iterations would have negligible impact on the populations of the k=100 clusters, and/or that most or all of the N=3 million samples are, in fact, assigned to a most-similar cluster center.

In cases where stability is judged at least partially based on the number of reassigned samples, it may be necessary to merge, e.g., using the merger 136, data from the available services/cores. That is, referring for example to the example of FIG. 1, it may occur that a single sample is reassigned to a new center at each of the cores 108, 110, 112. Thus, the merger 136 may merge data from the cores 108, 110, 112, to determine that a total of three re-assignments have occurred.

Thus, if a desired level of stability is determined (408), then the algorithm of the flowchart 400 may complete (410). Otherwise (408), it may be necessary or desirable to compute updated cluster centers for the k=100 clusters in question (412).

That is, as described above, e.g., with respect to the operation 402, the algorithm of the flowchart 400 may initially begin with a random selection of k cluster centers. For example, in the simplified example given above in which cluster centers are defined based on geographical location customers, then the operation 402 may initially and randomly select 100 customers in associated geographical locations. However, inasmuch as such selections are random, it may occur that the thus-selected cluster centers are non-representative or otherwise non-desirable. For example, it may occur that all 100 of the geographical locations are located very close to one another.

Consequently, as just referenced, the operation 412 may be designed to compute new, updated cluster centers which may be more representative of an actual, desired distribution of desired characteristics or attributes of the relevant samples (e.g., customers). In other words, new, updated cluster centers may be determined which enable the possibility of minimizing a distance between each of the N=3 million samples and at least one corresponding cluster center.

In conventional implementations of the k-means algorithm, the operation 412 may be executed by calculating total distances between each sample and its current or (if applicable) newly-assigned cluster center. Then, a mean or average of all samples in each cluster may be determined, and each such calculated mean may thereafter be utilized as a new cluster center of the k=100 cluster centers.

In the implementation of FIG. 4, the total distances between each of the samples and the current center of their newly-assigned clusters (if re-assignment has occurred) may be calculated in parallel at each server/core. Subsequently, an actual calculation of the new centers may be executed centrally, and the algorithm may continue with operation 404. In other words, as is known, and is shown in FIG. 4, similarity computations may thereafter continue as described above with respect to the operation 404, until stability is reached (408), and the algorithm of the flowchart 400 completes (410).

Pseudocode sections 1-3, provided below, illustrate example implementations according to the flowchart 400 of FIG. 4. Specifically, as shown below, Pseudocode 1 illustrates an example function for calculating the Euclidean distance of Equations 1 and 2, while Pseudocode 2 illustrates an example in which a distance (e.g., similarity) is computed in parallel using a number of cores C. Finally, Pseudocode 3 illustrates an implementation of the K-means algorithm of FIG. 4, which may include the calculations of Pseudocode sections 1 and 2.

Pseudocode 1

1. FUNCTION Euclidean_Distance (Vector x_vec, Vector y_vec)
2. BEGIN
3.   for i := 0 to size(x_vec) do
4.     distance += ( x_vec[i] − y_vec[i] ) ˆ2
5.   end for
6.   distance := sqrt(distance)
7.   return distance
8. END Pseudocode 2

1. % C: the number of cores
2. FUNCTION Euclidean_Distance (Vector x_vec, Vector y_vec)
3. BEGIN
4.   N := size(x_vec)
5.   Vector distance = new Vector[C]
6.   On Core 1:
7.     for i := 0 to INT(N/C) do
8.       distance[1] += ( x_vec[i] − y_vec[i] ) ˆ2
9.     end for
10.  On Core 2:
11.    for i := INT(N/C) to 2*INT(N/C) do
12.      distance[2] += ( x_vec[i] − y_vec[i] ) ˆ2
13.    end for
14.  ... ...
15.  On Core C:
16.    for i := INT(N(1−1/C)) to N do
17.      distance[C−1] += ( x_vec[i] − y_vec[i] ) ˆ2
18.    end for
19.  result := sqrt(sum(distance))
20.  return result
END

| Pseudocode 3 |
|---|

```
1. FUNCTION K_Means_Parallel
2. % K: the number of cluster
3. % nSamples: the number of samples
4. % nDimensions: the number of dimensions
5. % [nSamples, nDimensions] := size(inputData)
6. % nServers: the number of servers
7.
8. % Set up the maximum number of iterations
9. MAX_ITER := 100
10.
11. Matrix center := new Matrix[K][nDimensions]
12. center := random select K samples
13.
14. % Set up storage for the cluster id of samples
15. Vector cluster_id := new Vector[nSamples]
16. Vector old_cluster_id := new Vector[nSamples]
17. old_cluster_id := ones(nSamples)
18.
19. % Set up storage for the cluster result
20. Matrix cluster_result := new Matrix[K][ ]
21.
22. while cluster_id != old_cluster_id && iter < MAX_ITER do
23.     Copy the new centers to S servers
24.     old_cluster_id := cluster_id
25.     On server 1:
26.         % Set up storage for the similarity between samples on this server and centers
27.         Matrix similarity_on_Server_1 := new Matrix[num_Samples_on_Server_1][K]
28.
29.         Matrix sum_on_Server_1 := new Matrix[K][nDimensions]
30.         % Compute similarity between the samples on this server and centers
31.         for i := 0 to num_Samples_on_Server_1 do
32.             for j := 0 to K do
33.                 similarity_on_Server_1[i][j] := Euclidean_Distance(
34.                     Samples_on_Server1[i], center_copy_1[j])
35.             end for
36.         end for
37.
38.         % Find out the cluster id (with minimum distance) for each sample
39.         for i := 0 to num_Samples_on_Server_1 do
40.             id := min_index(similarity_on_Server_1)
41.             cluster_id[i] := id
42.             cluster_result[id].pushback[i]
43.         end for
44.
45.         % For each cluster, compute the sum of the corresponding samples on this server
46.         for i := 0 to num_Samples_on_Server_1 do
47.             if Samples_on_Server1[i].cluster_id == m then
48.                 sum_on_Server_1[m] += Samples_on_Server1[i]
49.             end if
50.         end for
51.
52.     On server 2:
53.         % Set up storage for the similarity between samples on this server and centers
54.         Matrix similarity_on_Server_2 := new Matrix[num_Samples_on_Server_2][K]
55.
56.         Matrix sum_on_Server_2 := new Matrix[K][nDimensions]
57.         % Compute similarity between the samples on this server and centers
58.         for i := 0 to num_Samples_on_Server_2 do
59.             for j := 0 to K do
60.                 similarity_on_Server_2[i][j] := Euclidean_Distance(
                        Samples_on_Server2[i], center_copy_2[j])
61.             end for
62.         end for
63.
64.         for i := 0 to num_Samples_on_Server_2 do
65.             id := min_index(similarity_on_Server_2)
66.             cluster_id[i+num_Sample_on_Server1] := id
67.             cluster_result[id].pushback[i+num_Sample_on_Server1]
68.         end for
69.
```

Pseudocode 3

```
70.         for i := 0 to num_Samples_on_Server_2 do
71.             if Samples_on_Server2[i].cluster_id == m then
72.                 sum_on_Server_2[m] += Samples_on_Server2[i]
73.             end if
74.         end for
75.     ......
76.  On server S:
77.         % Set up storage for the similarity between samples on this server and centers
78.         Matrix similarity_on_Server_S := new Matrix[num_Samples_on_Server_S][K]
79.
80.         Matrix sum_on_Server_S := new Matrix[K][nDimensions]
81.         % Compute similarity between the samples on this server and centers
82.         for i := 0 to num_Samples_on_Server_S do
83.             for j := 0 to K do
84.                 similarity_on_Server_S[i][j] := Euclidean_Distance(
                             Samples_on_ServerS[i], center_copy_S[j])
85.             end for
86.         end for
87.
88.         for i := 0 to num_Samples_on_Server_S do
89.             id := min_index( similarity_on_Server_S )
90.             cluster_id[i+nSamples-num_Samples_on_Server_S] := id
91.             cluster_result[id].pushback[i+nSamples-num_Samples_on_Server_S]
92.         end for
93.
94.         for i := 0 to num_Samples_on_Server_S do
95.             if Samples_on_ServerS[i].cluster_id == m then
96.                 sum_on_Server_S[m] += Samples_on_ServerS[i]
97.             end if
98.         end for
99.
100. % Update the centers
101. Matrix sum := new Matirx[K][nDimensions]
102. for i := 0 to K do
103. sum += sum_on_Server_i
104. end for
105. for i:= 0 to K do
106.    center[i] := sum[i] / size(cluster_result[i])
107. end for
108.
109. end while
110. return cluster_result
111. END
```

Thus, the features and functions of FIGS. 1-5B provide for fast, efficient, and timely grouping of samples into a desired number of clusters, using the parallel processing techniques described herein. Of course, it may be appreciated that the provided examples are intended for the sake of illustration only, and are not intended to be limiting in any way. For example, it may be appreciated that the techniques described herein may be utilized in virtually any context in which the types of joint operations referenced herein are desired to be implemented with respect to a relatively large dataset and a relatively much smaller dataset. As described, in such contexts, the entirety of the relatively smaller dataset may be copied to each of a plurality of available cores, and the larger dataset may be subdivided into a number of subsets corresponding to the number of available cores. Thereafter, parallelized processing may proceed, so that, upon merging of the executed joint operations, it is assured that the calculation results are inclusive over all combinations of the two datasets. Thus, the advantages of parallel processing may be obtained in such contexts and settings, in which such joint operations were previously limited to conventional, serial processing.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium, the system comprising:
    a cluster selector configured to determine a plurality of sample clusters, and to reproduce the plurality of sample clusters for processing by a plurality of processing cores, wherein each of the reproduced plurality of sample clusters is stored for processing by a corresponding group of at least two of the plurality of processing cores;
    a sample divider configured to divide a plurality of samples stored in a database with associated attributes into a number of sample subsets corresponding to a number of the corresponding groups of the plurality of processing cores, and further configured to associate each of the number of sample subsets with a corresponding group of the plurality of processing cores;
    a joint operator configured to perform a comparison of each sample of each sample subset with respect to each of the plurality of sample clusters reproduced at the corresponding group, based on associated attributes thereof; and
    an attribute divider configured to divide, for each sample subset, attributes associated with each sample thereof into attribute subsets for parallel processing thereof during the performing of the comparison and using the at least two of the plurality of processing cores of the corresponding group.

2. The system of claim 1, wherein the cluster selector is configured to receive a number of the plurality of sample clusters from a user by way of a graphical user interface (GUI).

3. The system of claim 1, comprising a merger configured to merge comparison results of the comparisons performed at each of the plurality of processing cores, to thereby populate the sample clusters with the plurality of samples.

4. The system of claim 1, wherein the number of sample subsets is equal to the number of the corresponding groups of the plurality of processing cores, and wherein each sample subset includes an equal number of samples.

5. The system of claim 1, wherein the comparison includes a similarity comparison performed at each of the plurality of processing cores between attributes of each corresponding attribute subset and a center of each cluster.

6. The system of claim 5, wherein the center of each cluster is determined using an average attribute value of the samples included in each cluster.

7. The system of claim 5, wherein the joint operator is configured to reassign samples from a first cluster to a second cluster, based on the comparison.

8. The system of claim 7, comprising a merger configured to merge comparison results of the comparison and configured to update a value of each center of each cluster, as needed, using the merged comparison results.

9. The system of claim 8, wherein the merger is configured to determine a stability of the samples within each cluster, based on a number of the reassigned samples.

10. A computer-implemented method, comprising:
    determining a plurality of samples stored in a database with associated attributes;
    determining a plurality of sample clusters;
    reproducing the plurality of sample clusters for processing by a plurality of processing cores, wherein each of the reproduced plurality of sample clusters is stored for processing by a corresponding group of at least two of the plurality of processing cores;
    dividing the plurality of samples into a number of sample subsets corresponding to a number of the corresponding groups of the plurality of processing cores;
    associating each of the number of sample subsets with a corresponding group of the plurality of processing cores;
    performing a comparison of each sample of each sample subset with respect to each of the plurality of sample clusters reproduced at the corresponding group, based on associated attributes thereof, and
    dividing, for each sample subset, attributes associated with each sample thereof into attribute subsets for parallel processing thereof during the performing of the comparison and using the at least two of the plurality of processing cores of the corresponding group.

11. The method of claim 10, further comprising merging comparison results of the comparisons performed at each of the plurality of processing cores, to thereby populate the sample clusters with the plurality of samples.

12. The method of claim 10, the performing the comparison further comprises performing a similarity comparison at each of the plurality of processing cores between attributes of each corresponding attribute subset and a center of each cluster.

13. A computer program product, the computer program product being tangibly embodied on a non-transitory computer-readable medium and comprising instructions that, when executed, are configured to:
  determine a plurality of samples stored in a database with associated attributes;
  determine a plurality of sample clusters;
  reproduce the plurality of sample clusters for processing by a plurality of processing cores, wherein each of the reproduced plurality of sample clusters is stored for processing by a corresponding group of at least two of the plurality of processing cores;
  divide the plurality of samples into a number of sample subsets corresponding to a number of the corresponding groups of the plurality of processing cores;
  associate each of the number of sample subsets with a corresponding group of the plurality of processing cores;
  perform a comparison of each sample of each sample subset with respect to each of the plurality of sample clusters reproduced at the corresponding group, based on associated attributes thereof, and
  divide, for each sample subset, attributes associated with each sample thereof into attribute subsets for parallel processing thereof during the performing of the comparison and using the at least two of the plurality of processing cores of the corresponding group.

14. The computer program product of claim 13, wherein the instructions, when executed, are configured to merge comparison results of the comparisons performed at each of the plurality of processing cores, to thereby populate the sample clusters with the plurality of samples.

15. The computer program product of claim 13, wherein the comparison includes a similarity comparison performed at each of the plurality of processing cores between attributes of each corresponding attribute subset and a center of each cluster.

16. The computer program product of claim 13, wherein the instructions, when executed, are configured to reassign samples from a first cluster to a second cluster, based on the comparison.

17. The computer program product of claim 16, wherein the instructions, when executed, are configured to determine a stability of the samples within each cluster, based on a number of the reassigned samples.

* * * * *